United States Patent Office.

WILLIAM B. GLEASON, OF BOSTON, MASSACHUSETTS.

Letters Patent No. 75,149, dated March 3, 1868.

---

IMPROVEMENT IN THE MANUFACTURE OF MOULDED ARTICLES.

---

The Schedule referred to in these Letters Patent and making part of the same.

---

TO ALL WHOM IT MAY CONCERN:

Be it known that I, WILLIAM B. GLEASON, of Boston, in the county of Suffolk, and State of Massachusetts, have invented an Improved Manufacture of Moulded Articles; and I do hereby declare that the following is a description of my invention sufficient to enable those skilled in the art to practise it.

This invention has for its main object the production of ornaments of plastic material with a surface of wood, so as very closely to imitate wood carvings.

I practise my invention as follows: Having a matrix or mould of the form of the article to be produced, I take thin veneers or shavings and moisten them, preferably by the use of hot water or steam. The veneers or shavings, whether moistened or not, I lay in the mould, and then press into the space in the mould upon the shaving or veneer, any suitable plastic adhesive compound that will afterward set and become hard. The plastic material which is forced by the action of a press into the mould, acts upon the thin shaving or veneer as a punch or die, which is the reverse of the mould, and causes the shaving to fit all parts thereof, while, by reason of the plastic nature of the filling or backing, the contact between it and the veneering is made perfect, and at the same time the adhesive nature of the compound insures the union of the facing to the backing. In some cases, where, from sharp angles or abrupt projections or depressions in the mould, there is danger of breakage or separation of the veneer or shaving, I make use of more than one thickness, which increases the chances of there being at the points of breakage at least one unbroken portion of wood. When the veneered object is dry and hard, all of the shavings, where more than one thickness is used, that come immediately into contact with the filling, will adhere to the filling, and the layers not adhering may be removed. I prefer, however, to use only moulds which are formed with reference to the employment of veneers or shavings, and in which the angles, projections, and depressions are comparatively slight, or of such form as to lessen the chances of breaking the wood facing. It is also productive of beneficial results to use the plastic adhesive compound in a hot state when it is pressed into the mould, as it renders the wood facing more pliable.

Many other substances may be used in lieu of veneers or shavings, as films, skins, or pellicles for covering and adhering to plastic adhesive backings or fillings, which are used while plastic to force the films to the shape of the mould.

I am aware that thin substances have been shaped to form by the action of hard, solid punches, which press such substances into moulds suited to the punches, which forms or shells have been afterward backed up or filled with plaster or other material. My invention, however, differs from the matter just referred to, and it may be said to consist in the process of forming in moulds articles which are covered with an adhering pellicle, by pressing the pellicle into the mould by an adhesive plastic substance or compound, as well as in articles so moulded.

I claim the process of producing moulded articles with an adhering pellicle, by the use of a plastic adhesive compound under pressure as a former, substantially as described.

Also, articles covered by moulding, substantially as described.

Witnesses:
J. B. CROSBY,
FRANCIS GOULD.

WILLIAM B. GLEASON.